(12) United States Patent
Gomyo et al.

(10) Patent No.: US 8,407,714 B2
(45) Date of Patent: Mar. 26, 2013

(54) ARITHMETIC DEVICE FOR PROCESSING ONE OR MORE THREADS

(75) Inventors: Norihito Gomyo, Kawasaki (JP); Toshio Yoshida, Kawasaki (JP); Ryuichi Sunayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 12/638,760

(22) Filed: Dec. 15, 2009

(65) Prior Publication Data

US 2010/0095306 A1   Apr. 15, 2010

Related U.S. Application Data

(63) Continuation of application No. PCT/JP2007/000650, filed on Jun. 20, 2007.

(51) Int. Cl.
  G06F 9/46    (2006.01)
  G06F 9/44    (2006.01)
  G06F 15/76   (2006.01)
  G06F 11/00   (2006.01)

(52) U.S. Cl. .......... 718/107; 718/102; 718/108; 712/43; 712/228; 712/229; 714/25; 714/47.1; 714/48

(58) Field of Classification Search .......... 718/100–104, 718/106–108; 714/1, 25, 48–57; 712/43, 712/220–229
See application file for complete search history.

(56) References Cited

U.S. PATENT DOCUMENTS

| | | | |
|---|---|---|---|
| 6,105,127 A | 8/2000 | Kimura et al. | |
| 6,233,599 B1 | 5/2001 | Nation et al. | |
| 6,748,556 B1 | 6/2004 | Storino et al. | |
| 7,000,233 B2 | 2/2006 | Levitan et al. | |
| 7,010,669 B2 * | 3/2006 | Burns et al. | 712/205 |
| 7,155,600 B2 | 12/2006 | Burky et al. | |
| 2003/0126416 A1 | 7/2003 | Marr et al. | |
| 2004/0210742 A1 | 10/2004 | Levitan et al. | |
| 2004/0215932 A1 * | 10/2004 | Burky et al. | 712/43 |
| 2004/0215939 A1 | 10/2004 | Armstrong et al. | |
| 2004/0216120 A1 | 10/2004 | Burky et al. | |
| 2006/0036889 A1 * | 2/2006 | Arai | 714/1 |

FOREIGN PATENT DOCUMENTS

| | | |
|---|---|---|
| GB | 2 398 660 A | 8/2004 |
| JP | 10-124316 | 5/1998 |
| JP | 2003-516570 | 5/2003 |
| JP | 2004-252987 | 9/2004 |
| JP | 2004-326749 | 11/2004 |
| JP | 2004-326752 | 11/2004 |
| JP | 2005-514698 | 5/2005 |
| JP | 3683837 | 6/2005 |
| JP | 2006-500639 | 1/2006 |
| JP | 2006-524380 | 10/2006 |

(Continued)

OTHER PUBLICATIONS

European Search Report dated Feb. 4, 2011 in corresponding European Patent Application 07790176.7.

(Continued)

*Primary Examiner* — Abdullah Al Kawsar
(74) *Attorney, Agent, or Firm* — Staas & Halsey LLP

(57) ABSTRACT

An arithmetic device simultaneously processes a plurality of threads and may continue the process by minimizing the degradation of the entire performance although a hardware error occurs. An arithmetic device 100 includes: an instruction execution circuit 101 capable of selectively executing a mode in which the instruction sequences of a plurality of threads are executed and a mode in which the instruction sequence of a single thread is executed; and a switch indication circuit 102 instructing the instruction execution circuit 101 to switch a thread mode.

9 Claims, 13 Drawing Sheets

FOREIGN PATENT DOCUMENTS

| | | |
|---|---|---|
| JP | 2006-343872 | 12/2006 |
| KR | 10-0388550 | 6/2003 |
| KR | 10-0617417 | 8/2006 |
| WO | 01/41529 A1 | 6/2001 |
| WO | 01/41530 A2 | 6/2001 |
| WO | 01/48599 A1 | 7/2001 |
| WO | 03/058434 A1 | 7/2003 |
| WO | 03/058447 A2 | 7/2003 |
| WO | 2004/095282 A1 | 11/2004 |

OTHER PUBLICATIONS

Extended European Search Report dated Jan. 31, 2012 issued in corresponding European Patent Application No. 11182687.1.

Korean Office Action issued Apr. 19, 2011 in corresponding Korean Patent Application 10-2009-7025991.

Japanese Office Action mailed Jun. 5, 2012 issued in corresponding Japanese Patent Application No. 2009-520138.

* cited by examiner

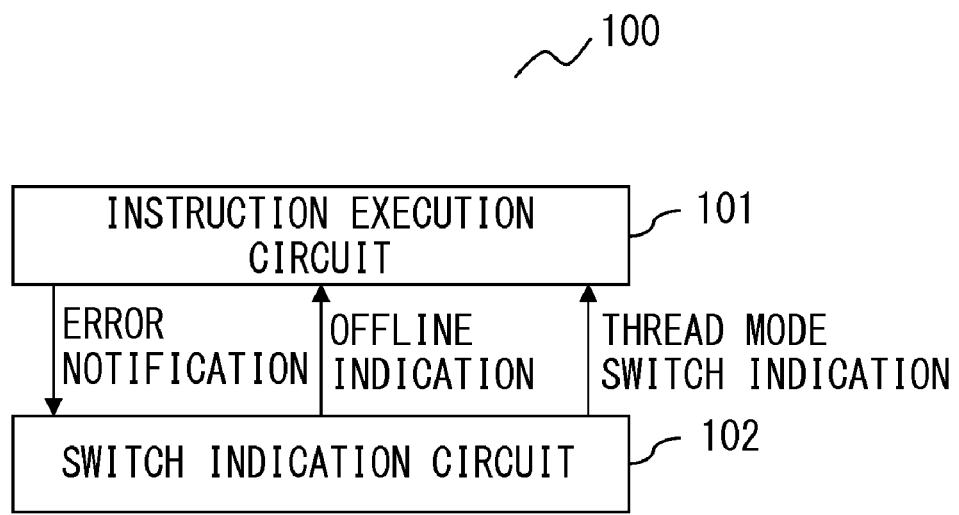
F I G. 1

| | |
|---|---|
| RESOURCES DIVIDED AMONG THREADS | CSE, GUB, FUB, RSBR, INSTRUCTION BUFFER, ETC. |
| RESOURCES SHARED AMONG THREADS | RSE, RSF, RSA, BRHIS, EAG, EXU, FLU, INSTRUCTION DECODER, ETC. |
| THREAD-SPECIFIC RESOURCES | PROGRAMMABLE REGISTER (GPR, FPR, PC, PSTATE, ETC.) |

FIG. 3

|  | MULTI-THREAD MODE | SINGLE THREAD MODE | | |
|---|---|---|---|---|
| STATE OF THREAD 0 | ACTIVE | ACTIVE | INACTIVE | INACTIVE |
| STATE OF THREAD 1 | ACTIVE | INACTIVE | ACTIVE | INACTIVE |

FIG. 5

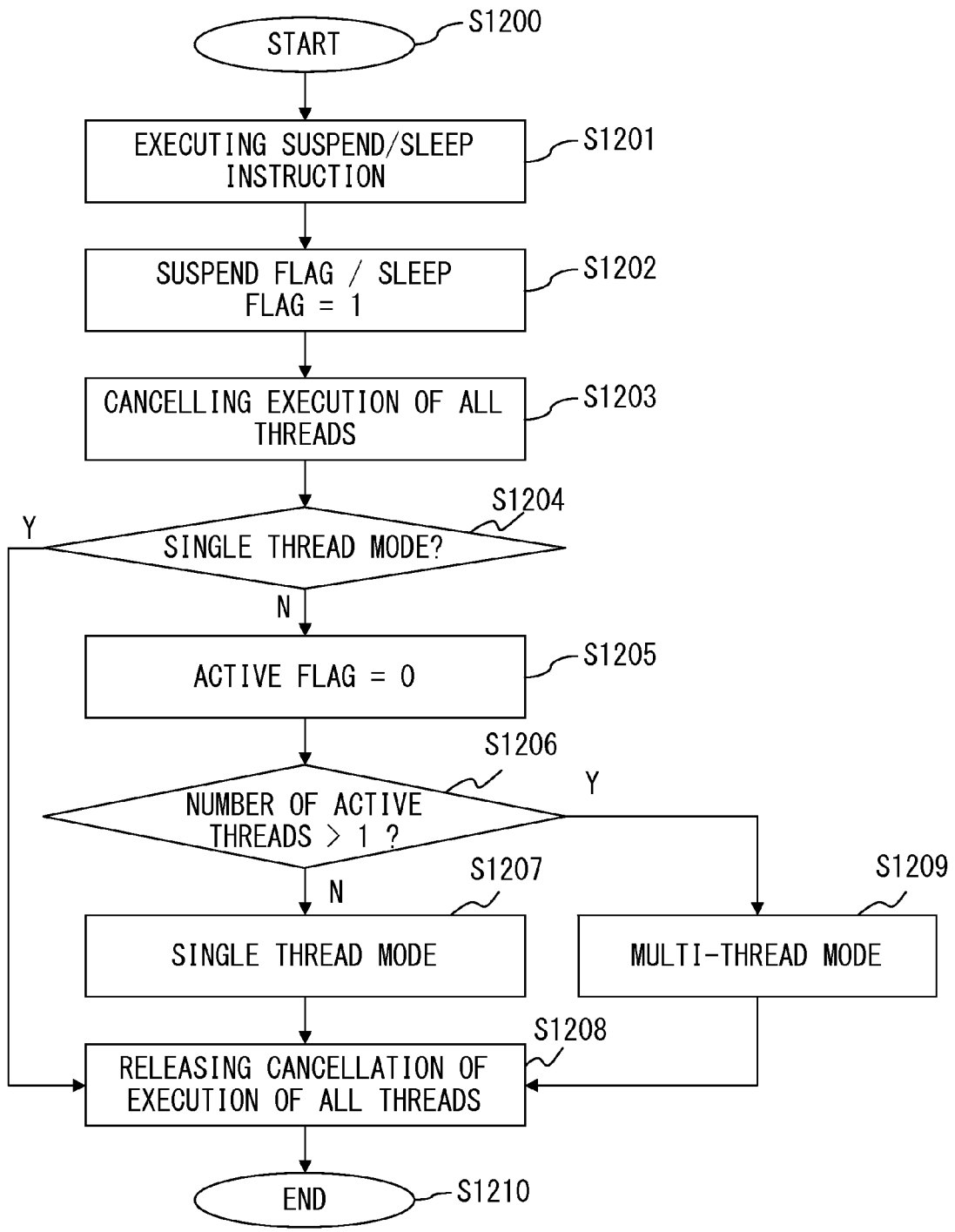
F I G. 1 2

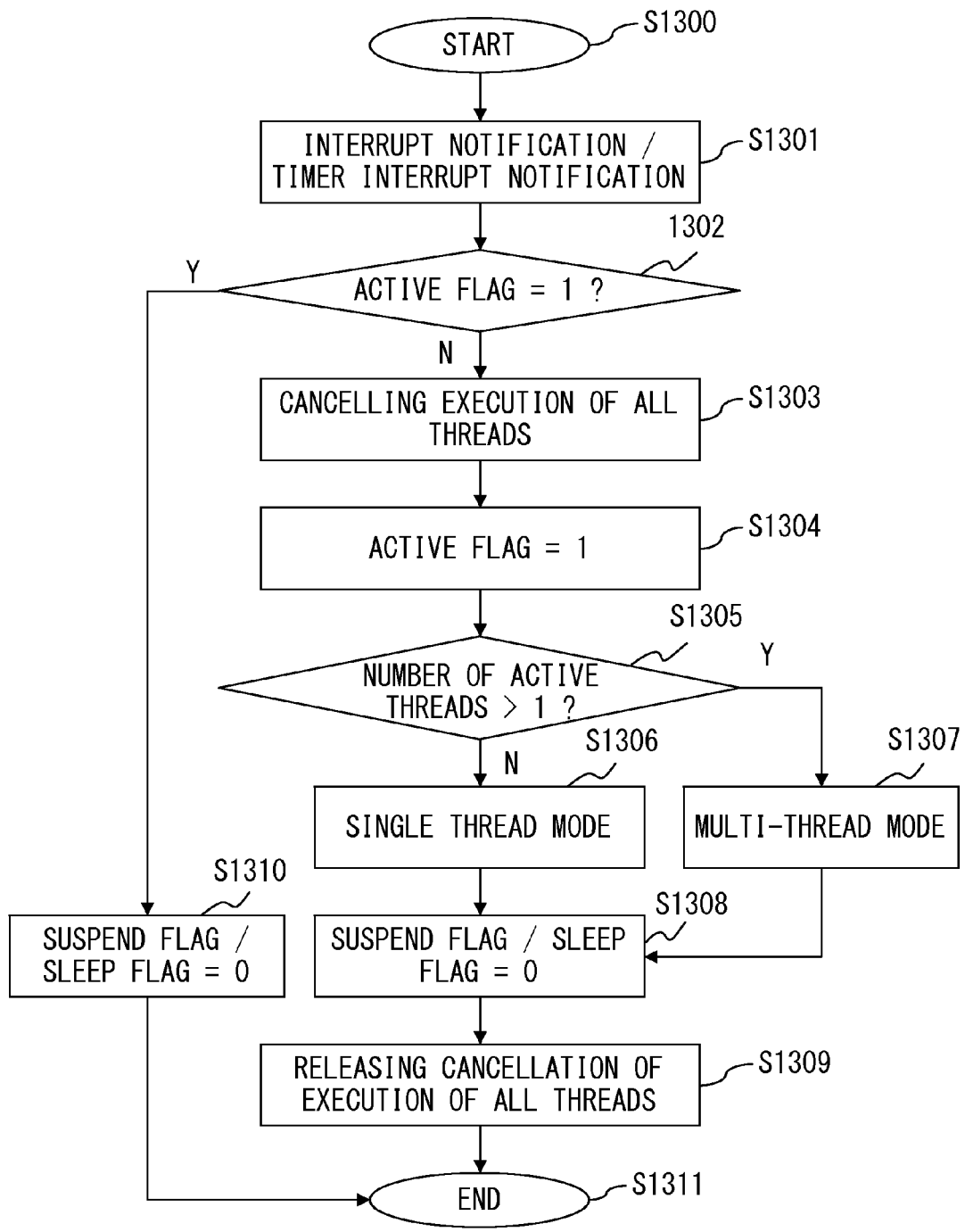
F I G. 13

ARITHMETIC DEVICE FOR PROCESSING ONE OR MORE THREADS

CROSS-REFERENCE TO RELATED APPLICATIONS

This application is a continuation of PCT application of PCT/JP2007/000650, which was filed on Jun. 20, 2007.

FIELD

The present invention relates to an arithmetic processing device, and more specifically to an arithmetic device for simultaneously processing a plurality of threads.

BACKGROUND

Recently, a number of processors have been proposed for improving the performance of an instruction by simultaneously processing the instruction sequences of a plurality of threads by hardware (hereinafter the processors are referred to as "multi-thread processors").

It may be necessary for the multi-thread processors to be internally provided with an architecture register (for example, a program counter, a general purpose register, etc.) for each thread. As a result, the amount of hardware of a multi-thread processor is larger than the amount of hardware of a processor for processing the instruction sequence of a single thread (hereinafter referred to as a "single thread processor"). The increasing amount of hardware causes a larger number of occurrences of hardware errors with the development of micro fabrication technique.

Accordingly, there is a demand for a processor capable of continuing processing without reducing the performance of the processor although a hardware error occurs.

In this respect, for example, the patent document 1 discloses a multi-thread processor for improving the entire process efficiency by dynamically realizing the performance required for each instruction sequence.

On the other hand, a multi-thread processor does not constantly execute the instruction sequences of a plurality of threads, but may execute only the instruction sequence of a single thread when, for example, it may be necessary to process only the instruction sequence of a single thread, or when other threads may not be processed until a certain thread is completely processed on the condition of software in the case where a lock release or synchronization between threads is awaited.

In this respect, for example, the patent document 2 discloses a method of changing the internal control of hardware by switching between a multi-thread mode and a single thread mode by executing an instruction to switch a thread mode.

The patent document 3 discloses an SMT (simultaneous multi-thread processing) system for optimization in any of the multi-thread mode and the single thread mode.

When a multi-thread processor supports a thread mode switch instruction to switch between valid and invalid states of a thread, it is possible to change from the single thread mode to the multi-thread mode. However, a thread that has newly entered a valid state is to start the execution from a specific address (for example, system reset interrupt handler etc.). Therefore, it is not suitable for a use in which the thread processing is temporarily suspended for a short time waiting for a lock release or for waiting for synchronization between threads.

In addition, when the above-mentioned thread mode switch instruction is used, there is no means for placing a thread in the valid state from software if all threads are placed in the invalid state. Therefore, an exception notification is transmitted to the software. Accordingly, all threads may not be simultaneously placed in the invalid state, and it may be necessary for the software to be certainly aware of the existence of other threads when the thread mode switch instruction is used.

In this connection, for example, the patent document 4 discloses a controlling method by executing an instruction to temporarily suspend the process of a thread, discarding a part of the resources dividable among threads that have been assigned to the thread, and reassigning them to another thread.

However, in this controlling method, only the assignment of the resources dividable among threads is changed. For example, the instruction processing controlling method may not be changed. Therefore, an instruction processing efficiency is degraded.

Patent Document 1: Japanese Laid-open Patent Publication No. 10-124316

Patent Document 2: Specification of U.S. Pat. No. 7,155,600

Patent Document 3: Japanese Laid-open Patent Publication No. 2004-326752

Patent Document 4: National Publication of International Patent Application No. 2005-514698

SUMMARY

The present invention has been developed to solve the above-mentioned problems, and aims at providing an arithmetic device capable of simultaneously processing a plurality of threads and continuing the processing with the degradation of the entire performance minimized although a hardware error occurs.

To solve the above-mentioned problems, the arithmetic device according to the present invention includes; an instruction execution circuit capable of selectively executing a multi-thread mode in which the instruction sequences of a plurality of threads are concurrently executed and a single thread mode in which the instruction sequence of a single thread is executed, and reassigning hardware resources when the selective execution is performed, and placing in an offline state an erroneous thread in which a hardware error has occurred during the execution of instruction sequence of the thread when the error is detected; and a switch indication circuit having for each thread an active state storage device for storing the active state of the thread, storing in the active state storage device the thread in the offline state as not being placed in an active state, and issuing an indication to the instruction execution circuit to switch between the multi-thread mode and the single thread mode depending on the change of the number of threads in the active state.

According to the present invention, the switch indication circuit stores a thread in the offline state as not being placed in the active state (as in the inactive state), and issues an indication to the instruction execution circuit to switch between the multi-thread mode and the single thread mode depending on the change of the number of the threads in the active state.

Then, the instruction execution circuit switches between the multi-thread mode and the single thread mode depending on the switch indication circuit, and reassigns hardware resources. For example, the hardware resources used after divided in the multi-thread mode are completely assigned to a single thread in the single thread mode.

As a result, although the multi-thread mode is switched to the single thread mode due to an occurrence of a hardware error etc., the hardware resources may be optimally used with the processing continued while improving the performance.

Therefore, the present invention may provide an arithmetic device capable of simultaneously processing a plurality of threads and continuing the processing by minimizing the degradation of the entire performance although a hardware error occurs.

BRIEF DESCRIPTION OF DRAWINGS

FIG. 1 is an explanatory view of the operation of the arithmetic device according to an embodiment of the present invention;

FIG. 3 is an example of the resources divided among threads, the resources shared among threads, and the thread-specific resources according to an embodiment of the present invention;

FIG. 5 is an explanatory view of the transition of the thread mode according to an embodiment of the present invention;

FIG. 12 is a flowchart of the thread mode switching process during the execution of the suspend instruction or the sleep instruction according to an embodiment of the present invention; and FIG. 13 is a flowchart of the thread mode switching process when the suspend state or the sleep state is released according to an embodiment of the present invention.

DESCRIPTION OF EMBODIMENTS

Figure 2:
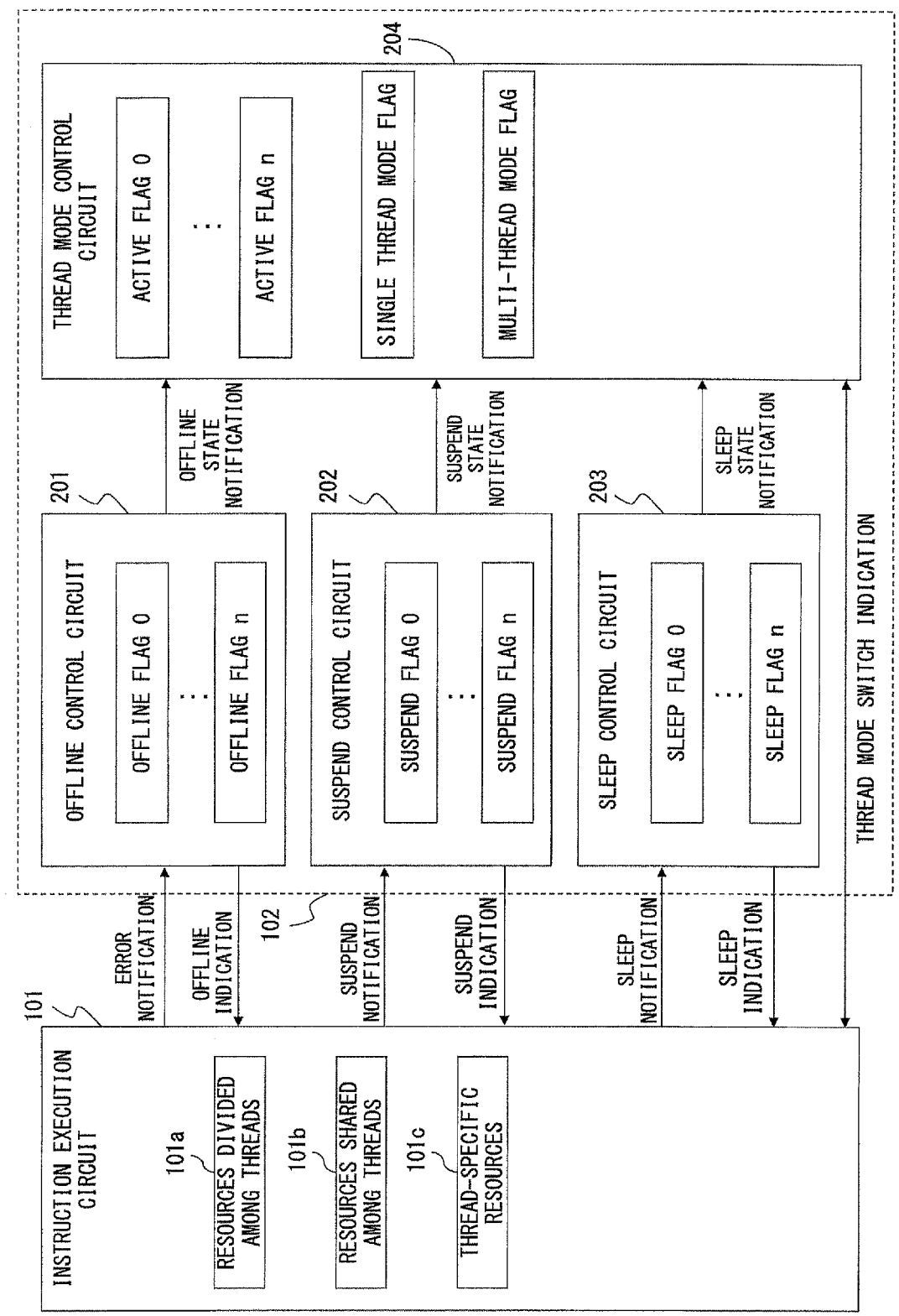
FIG. 2 illustrates the outline of the entire configuration of the arithmetic device according to an embodiment of the present invention.

The embodiments of the present invention are described below with reference to FIGS. 1 through 13.

FIG. 1 is an explanatory view of the operation of the arithmetic device 100 according to an embodiment of the present invention.

The arithmetic device 100 illustrated in FIG. 1 includes: an instruction execution circuit 101 capable of selectively executing a mode in which the instruction sequences of a plurality of threads are executed (hereinafter referred to as a "multi-thread mode") and a mode in which an instruction sequence of a single thread is executed (hereinafter referred to as a "single thread mode"); and a switch indication circuit 102 for issuing to the instruction execution circuit 101 an indication to switch the thread mode.

The instruction execution circuit 101 may concurrently process a plurality of threads configured by one or more instruction sequences. For example, it fetches an instruction, decodes an instruction, executes an arithmetic operation, completes an instruction, issues an instruction to update programmable resources, checks a hardware error during the execution of an instruction, etc. for each thread.

In addition, when the instruction execution circuit 101 detects a hardware error during the execution of an instruction for each thread, it notifies the switch indication circuit 102 of the thread executed when the hardware error occurred (hereinafter referred to as an "erroneous thread") and that the hardware error has occurred. The notification is hereinafter referred to as an "error notification".

Furthermore, upon receipt of an indication to place an erroneous thread in the offline state from the switch indication circuit 102 (hereinafter referred to as an "offline indication"), the circuit changes the erroneous thread into the offline state.

The offline state refers to a state in which an instruction on the thread is not processed, an interrupt notification to the thread is not accepted, or a hardware error in the hardware resources (for example, thread-specific resources) in the thread is not detected.

The circuit also selectively executes the process (multi-thread mode process) of concurrently executing the instruction sequences of a plurality of threads and the process (single thread process) of executing only the instruction sequence of a single thread at the thread mode switch indication from the switch indication circuit 102.

When the multi-thread mode is switched into the single thread mode, the instruction execution circuit 101 optimizes necessary hardware resources (resources divided among threads and resources shared among threads as described later) for executing the thread into the single thread mode.

For example, it performs the process of reassigning the entire instruction buffer to a single thread when the mode is switched to the single thread mode from the multi-thread mode in which the instruction buffer is divided and assigned to each thread.

The optimization is similarly performed when the mode is switched from the single thread mode to the multi-thread mode.

Upon receipt of an error notification from the instruction execution circuit 101, the switch indication circuit 102 issues an offline indication to the instruction execution circuit 101.

The switch indication circuit 102 holds the execution status of each thread.

The execution status refers to an active state of each thread, or a state in which each thread is not in an active state (hereinafter referred to as an "inactive state").

The active state is a state in which, for example, the hardware resources (for example, resources divided among threads, resources shared among threads, and thread-specific resources) have already been assigned to a thread, and the instruction sequence of the thread may be executed or is being executed using the hardware resources. Therefore, the state such as the offline state, the suspend state, the sleep state, etc. of a thread is the inactive state.

The suspend state is a state in which the instruction executing process is suspended until a predetermined interrupt notification is input at, for example, a suspend instruction. The sleep state is a state in which the instruction executing process is suspended until a predetermined time has passed (until a timer interrupt notification is input) at, for example, a sleep instruction.

When the number of the threads in the active state is one or less (more than 0), the switch indication circuit 102 instructs the instruction execution circuit 101 to switch from the multi-thread mode to the single thread mode. In addition, when the number of threads in the active state is 2 or more, the switch indication circuit 102 instructs the instruction execution circuit 101 to switch from the single thread mode to the multi-thread mode.

FIG. 2 illustrates the outline of the entire configuration of the arithmetic device 100 according to an embodiment of the present invention.

As illustrated in FIG. 2, the arithmetic device 100 includes the instruction execution circuit 101 capable of selectively executing the multi-thread mode and the single thread mode, and the switch indication circuit 102 for instructing the instruction execution circuit 101 to switch the thread mode.

The switch indication circuit 102 further includes: an offline control circuit 201 for controlling the offline state of each thread; a suspend control circuit 202 for controlling the suspend state of each thread; a sleep control circuit 203 for controlling the sleep state of each thread, and a thread mode control circuit 204 for issuing a thread mode switch indication depending on the state of each thread.

The instruction execution circuit 101 includes: a resources 101a divided among threads to be used after dividing and combining the resources depending on the thread mode; a resources 101b shared among threads shared by a plurality of threads; and a thread-specific resources 101c constantly used only by a specific thread independent of the thread mode.

Described below with reference to FIG. 3 are practical examples of the resources 101a divided among threads, the resources 101b shared among threads, and the thread-specific resources 101c.

The resources 101a divided among threads may be a CSE (commit stack entry), a GUB (GPR update buffer), an FUB (FPR update buffer), an RSBR (reservation station for branch), an instruction buffer, etc.

The resources 101b shared among threads may be an RSE (reservation station for execution), an RSF (reservation station for floating point), an RSA (reservation station for address gen) a BRHIS (branch history), an EAG (effective address generator), an EXU (extraction unit), an FLU (floating point unit), an instruction decoder, etc.

The thread-specific resources 101c may be a programmable register such as a GPR (general purpose register), an FPR (floating point register), a PC (program counter), a PSTATE (processor state), etc.

Using each of the above-mentioned hardware resources, the instruction execution circuit 101 fetches an instruction, decodes an instruction, executes an arithmetic operation, completes an instruction, issues an instruction to update programmable resources, checks a hardware error during the execution of an instruction, etc. for each thread.

In addition, when the instruction execution circuit 101 detects a hardware error during the execution of an instruction, it transmits an error notification to the offline control circuit 201.

After the instruction execution circuit 101 executes the suspend instruction, it notifies the suspend control circuit 202 that the suspend instruction has been executed (the notification is hereinafter referred to as a "suspend notification").

When the instruction execution circuit 101 executes the sleep instruction, it notifies the sleep control circuit 203 that the sleep instruction has been executed (the notification is hereinafter referred to as a "sleep notification").

Upon receipt of an indication from the offline control circuit 201 to change the corresponding threshold into the offline state (hereinafter referred to as an "offline indication"), the instruction execution circuit 101 changes the thread into the offline state.

Upon receipt of an indication from the suspend control circuit 202 to change the corresponding thread into the suspend state (hereinafter referred to as a "suspend indication"), the instruction execution circuit 101 changes the thread into the suspend state.

Upon receipt of an indication from the sleep control circuit 203 to change the corresponding thread into the sleep state (hereinafter referred to as a "sleep indication"), the instruction execution circuit 101 changes the thread into the sleep state.

When the suspend indication or the sleep indication is released, the instruction execution circuit 101 immediately resumes the execution of the corresponding thread.

At an indication from the thread mode control circuit 204, the instruction execution circuit 101 selectively switches and executes the multi-thread mode process and the single thread mode process (the indication is hereinafter referred to as a "thread mode switch indication").

The offline control circuit 201 controls the change of each thread into the offline state.

The offline control circuit 201 is provided with an offline flag (offline flags 0 through n (n indicates a natural number. The same holds true with the subsequent explanation) for each thread, and sets the corresponding offline flag to "1" upon receipt of an error notification from the instruction execution circuit 101.

Upon receipt of an indication to release the offline state by a JTAG circuit not illustrated in the attached drawings but provided for the arithmetic device 100 (the indication is hereinafter referred to as an "offline release indication"), the corresponding offline flag is set to "0".

The value of each offline flag is output to the instruction execution circuit 101. The output is an offline indication. That is, when the value of the offline flag is set to "1", the instruction execution circuit 101 changes the corresponding thread into the offline state.

The value of each offline flag is also output to the thread mode control circuit 204. The output is hereinafter referred to as an "offline state notification".

The suspend control circuit 202 controls the change of each thread into the suspend state.

The suspend control circuit 202 is provided with a suspend flag (suspend flags 0 through n) for each thread, and sets the corresponding suspend flag to "1" upon receipt of a suspend notification from the instruction execution circuit 101.

Upon receipt of a specific interrupt notification (the notification is hereinafter referred to simply as an "interrupt notification") from an interrupt circuit not illustrated in the attached drawings but provided for the arithmetic device 100, the corresponding suspend flag is set to "0".

The value of each suspend flag is output to the instruction execution circuit 101. The output is a suspend indication. That is, when the value of the suspend flag is set to "1", the instruction execution circuit 101 changes the corresponding thread in to the suspend state.

The value of each suspend flag is also output to the thread mode control circuit 204. The output is hereinafter referred to as a "suspend state notification".

The sleep control circuit 203 controls the change of the sleep state of each thread.

The sleep control circuit 203 is provided with a sleep flag (sleep flags 0 through n) for each thread, and, sets the corresponding sleep flag to "1" upon receipt of a sleep notification from the instruction execution circuit 101.

Upon receipt of a specific interrupt notification or an interrupt notification from the timer circuit (hereinafter referred to simply as a "timer interrupt notification") not illustrated in the attached drawings but provided for the arithmetic device 100, the sleep control circuit 203 sets the corresponding sleep flag "0"

The value of each sleep flag is output to the instruction execution circuit 101. The output is a sleep indication. That is, when the value of the sleep flag is set to "1", the instruction execution circuit 101 changes the corresponding thread into the sleep state.

The value of each sleep flag is also output to the thread mode control circuit 204. The output is hereinafter referred to as a "sleep state notification".

In the present embodiment, the suspend control circuit 202 and the sleep control circuit 203 refer to the active flag not illustrated in the attached drawings before setting the suspend flag or the sleep flag to "0". Only when the active flag indicates "1", the suspend flag or the sleep flag is set to "0". When the active flag is "0", the value of the suspend flag or the sleep flag is not changed until the thread mode control circuit 204 sets the active flag to "1".

When the suspend flag or the sleep flag is set to "0" without changing the active flag, the thread mode control circuit 204 does not perform a series of the processes of cancelling the execution, changing the thread mode, and releasing the cancellation on all threads. Therefore, the overhead for the process resumption from the suspend state (sleep state) may be reduced.

The suspend control circuit 202 and the sleep control circuit 203 according to the present embodiment are not essential components of the arithmetic device 100.

The thread mode control circuit 204 is provided with active flags 0 through n for management of the active state of each thread, and a thread mode flag (multi-thread mode flag and single thread mode flag) for control of the thread mode.

Upon receipt of an offline state notification from the offline control circuit 201, the thread mode control circuit 204 sets the active flag for management of a thread in the offline state to "0".

Upon receipt of the suspend state notification from the suspend control circuit 202, the thread mode control circuit 204 sets the active flag for management of the thread in the suspend state to "0".

Upon receipt of the sleep state notification from the sleep control circuit 203, the thread mode control circuit 204 sets the active flag for management of the thread in the sleep state to "0".

When the number of active flags set to "1" is 1 or less (0 or more), the thread mode control circuit 204 sets the single thread mode flag to "1" (sets the multi-thread mode flag to "0"). When the number of active flags set to "1" is two or more, the thread mode control circuit 204 the multi-thread mode flag to "1" (sets the single thread mode to "0").

If the values of the multi-thread mode flag and the single thread mode flag are output to the instruction execution circuit 101, and the multi-thread mode flag is set to "1" (the single thread mode flag is set to "0"), then the instruction execution circuit 101 operates in the multi-thread mode. If the single thread mode flag is set to "1" (the multi-thread mode flag is set to "0"), then the instruction execution circuit 101 operates in the single thread mode.

Figure 4:
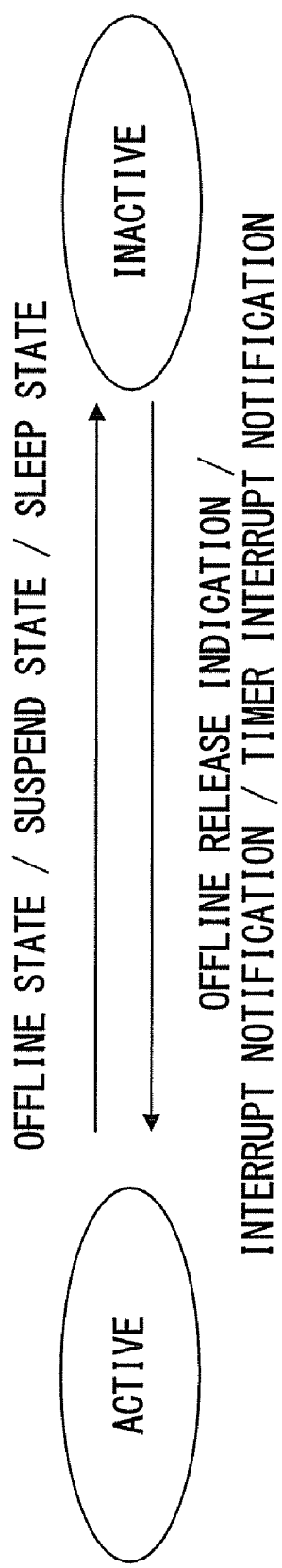
FIG. 4 is an explanatory view of the transition of the active state according to an embodiment of the present invention.

FIG. 4 is an explanatory view of the transition of the active state according to an embodiment of the present invention.

If the offline control circuit 201 sets the offline flag to "1", the suspend control circuit 202 sets the suspend flag to "1", or the sleep control circuit 203 sets the sleep flag to "1", then the thread mode control circuit 204 sets the active flag of the corresponding thread to "0".

Therefore, when the thread is placed in the offline state, the suspend state, or the sleep state, the thread enters the inactive state.

On the other hand, if the offline control circuit 201 sets the offline flag to "0" at the offline release indication, the suspend control circuit 202 sets the suspend flag to "0" at the specific interrupt notification, or the sleep control circuit 203 sets the sleep flag to "0" at the timer interrupt notification, then the thread mode control circuit 204 sets the active flag of the corresponding thread, thereby placing the thread in the active state.

FIG. 5 is an explanatory view of the transition of the thread mode according to an embodiment of the present invention. FIG. 5 illustrates the transition of the thread mode when the number n of the threads is 2 for comprehensibility.

When a thread 0 is in the active state (an active flag 0 is "1"), and a thread 1 is in the active state (an active flag 1 is "1"), the number of threads in the active state is two or more. Therefore, the multi-thread mode flag is set to "1" (the single thread mode flag is set to "0"), and the instruction execution circuit 101 operates in the multi-thread mode.

If the thread 0 is in the active state (the active flag 0 is "1"), and the thread 1 is in the inactive state (the active flag 1 is "0"), then the number of threads in the active state is 1 or less. Therefore, the single thread mode flag is set to "1" (the multi-thread mode flag is "0"), and the instruction execution circuit 101 operates in the single thread mode.

When the thread 0 is in the inactive state (the active flag 0 is "0") and the thread 1 is in the active state (the active flag 1 is "1"), and when the thread 0 is in the inactive state (the active flag 0 is "0"), and the thread 1 is in the inactive state (the active flag 1 is "0") and the thread 1 is in the inactive state (the active flag 1 is "0"), the number of the threads in the active state is 1 or less. Therefore, the single thread mode flag is set to "1" (the multi-thread mode flag is set to "0"), and the instruction execution circuit 101 operates in the single thread mode.

Figure 6:
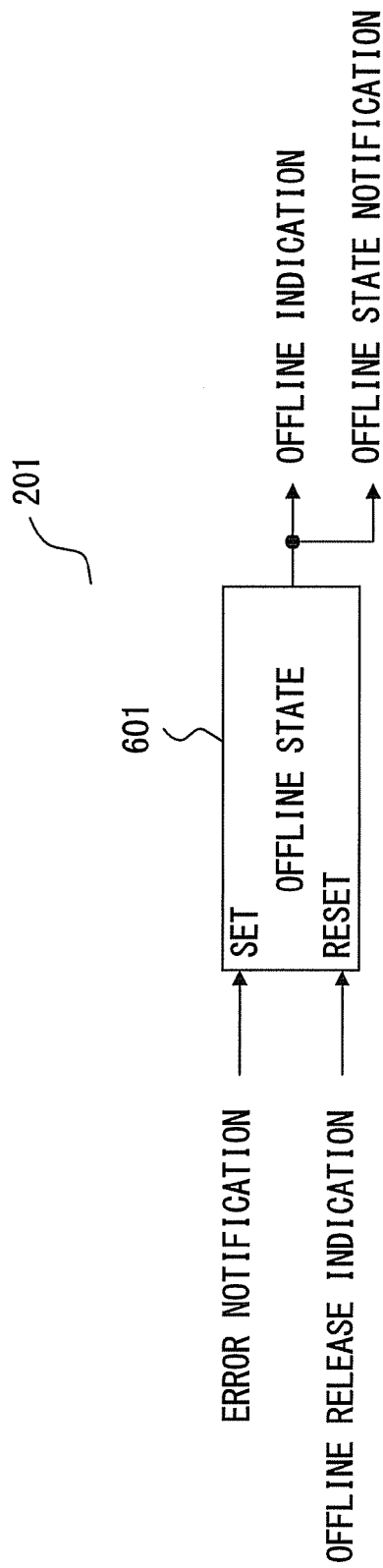
FIG. 6 is an example of a practical configuration of an offline control circuit according to an embodiment of the present invention.

FIG. 6 is an example of a practical configuration of an offline control circuit 201 according to an embodiment of the present invention.

The offline control circuit 201 is configured by a register (for example, RS-FF) 601 for receiving an error notification from the instruction execution circuit 101 at the setting terminal and an offline release indication at the resetting terminal. The value held by the register 601 is output as an offline indication and an offline state notification to the instruction execution circuit 101 and the thread mode control circuit 204 respectively.

Figure 7:
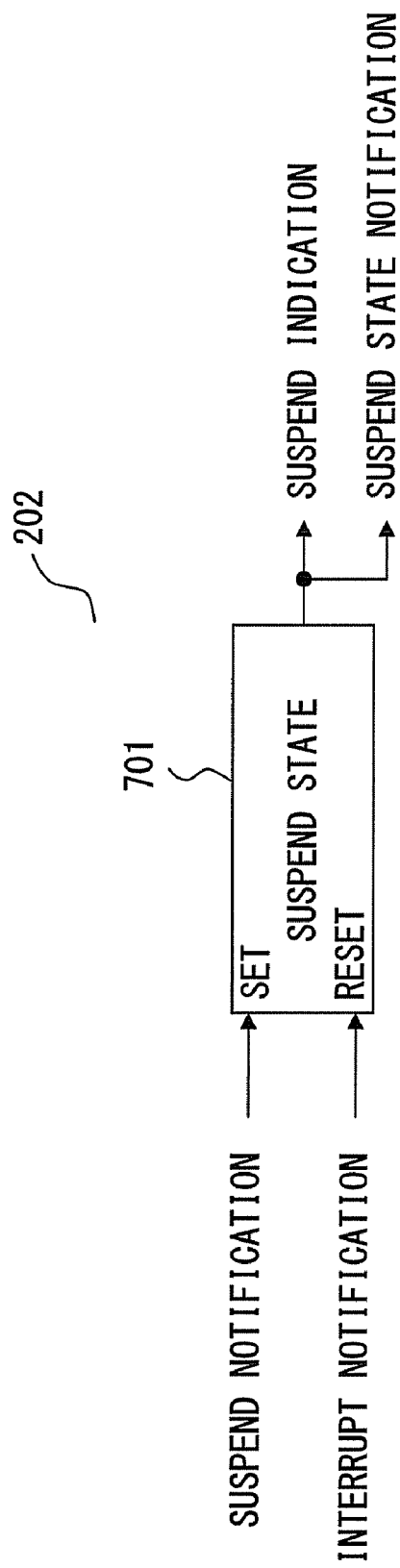
FIG. 7 is an example of a practical configuration of a suspend control circuit according to an embodiment of the present invention.

FIG. 7 is an example of a practical configuration of the suspend control circuit 202 according to an embodiment of the present invention.

The suspend control circuit 202 according to the present embodiment is configured by a register (for example, RS-FF) 701 for receiving a suspend notification from the instruction execution circuit 101 at the setting terminal and a specific interrupt notification at the resetting terminal. The values held by the register 701 are output as a suspend indication and a suspend state notification respectively to the instruction execution circuit 101 and the thread mode control circuit 204.

Figure 8:
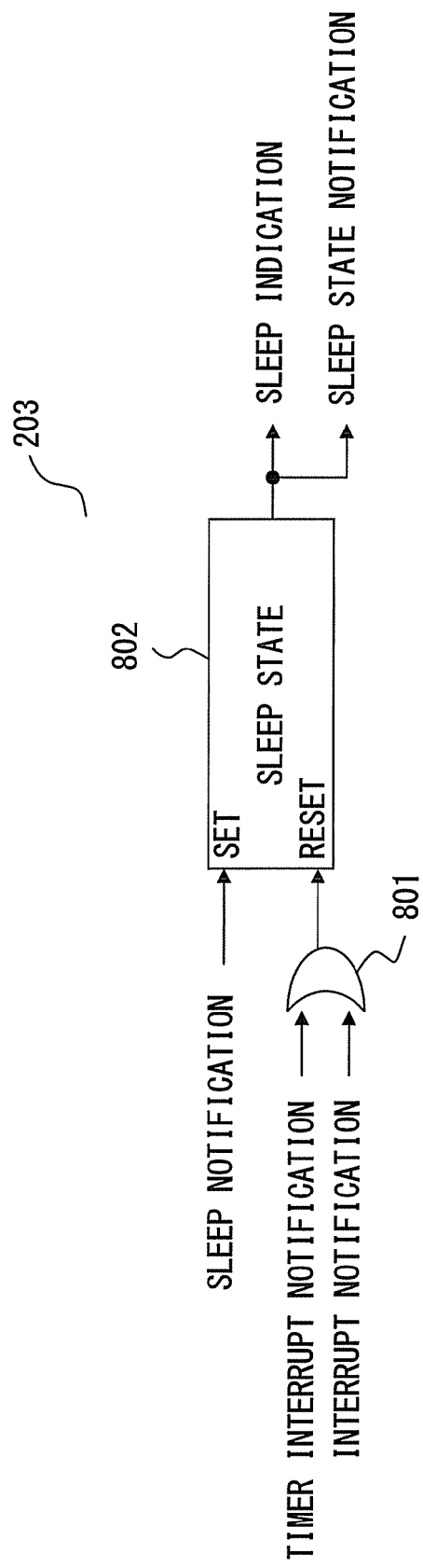
FIG. 8 is an example of a practical configuration of a sleep control circuit according to an embodiment of the present invention.

FIG. 8 is an example of a practical configuration of the sleep control circuit according to an embodiment of the present invention.

The sleep control circuit 203 according to the present embodiment is configured by a logical sum circuit 801 for receiving a timer interrupt notification and a predetermined interrupt notification (except the timer interrupt notification), and a register (for example, an RS-FF) 802 for receiving a sleep notification from the instruction execution circuit 101 at the setting terminal and the output of the logical sum circuit 801 at the resetting terminal. The values held by the register 802 are output as a sleep indication and a sleep state notification respectively to the instruction execution circuit 101 and the thread mode control circuit 204.

Figure 9:
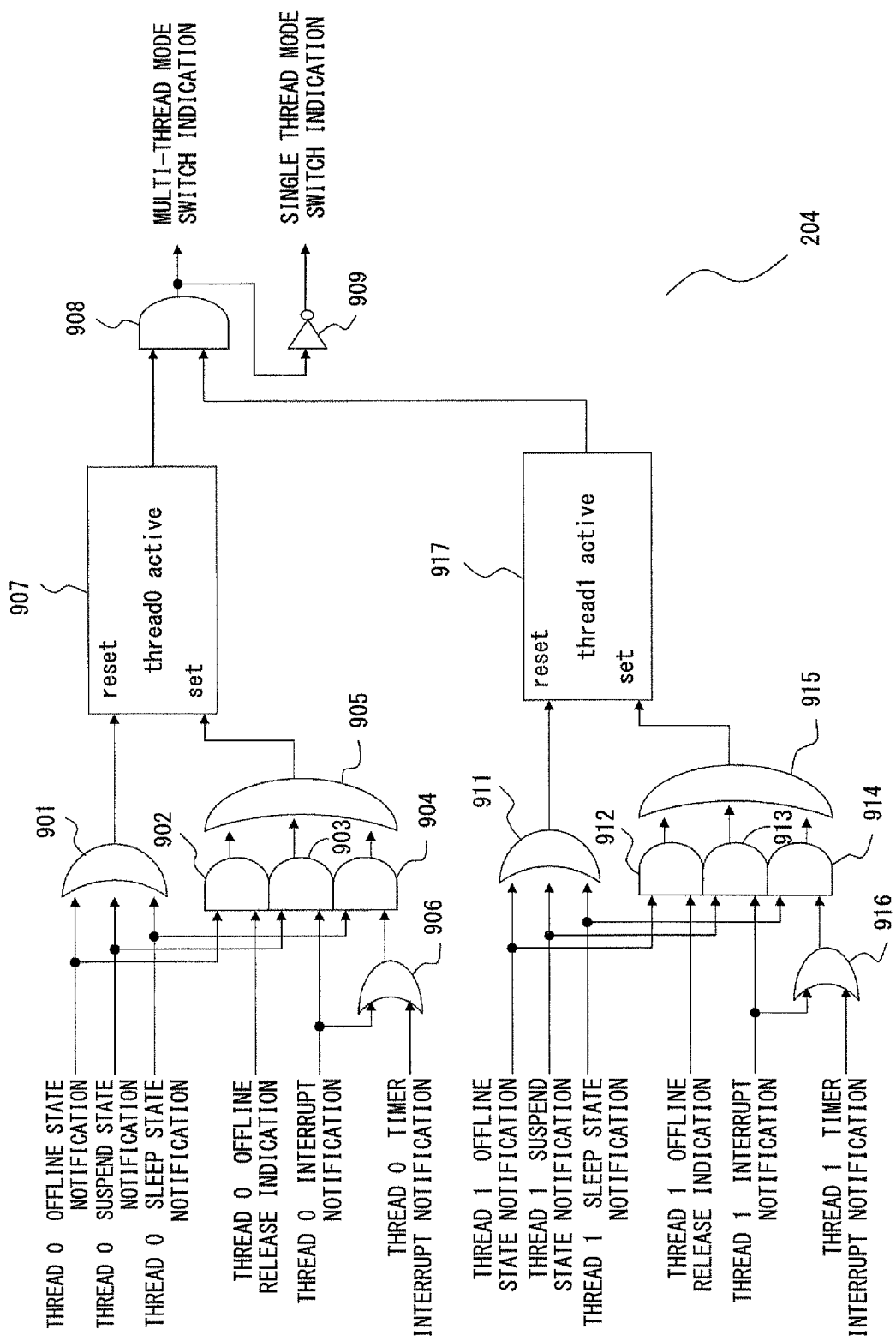
FIG. 9 is an example of a practical configuration of a thread mode control circuit according to an embodiment of the present invention.

FIG. 9 is an example of a practical configuration of the thread mode control circuit 204 according to an embodiment of the present invention. For comprehensibility of the configuration, the number n of the threads is 2 in the example of the configuration of the thread mode control circuit 204, but it is not limited to 2 in the present invention. When the number of threads is 3 or more, the numbers of the components 901 through 907 illustrated in FIG. 9 are to be equal to the number of the threads.

The thread mode control circuit 204 illustrated in FIG. 9 includes the logical circuits 901 through 906 for receiving the offline state notification etc. of the thread 0, the register 907 as an active flag of the thread 0, logical circuits 911 through 916 for receiving the offline state notification etc. of the thread 1, a register 917 as an active flag of the thread 1, a logical product circuit 908 for receiving the output of the registers 907 through 917, and a negation circuit 909 for receiving the output of the logical product circuit 908.

In the example of the configuration in FIG. 9, the registers 907 through 917, the logical product circuit 908, and the negation circuit 909 realize the multi-thread mode flag and the single thread mode flag.

The logical sum circuit 901 receives the offline state notification from the offline control circuit 201 for managing the thread 0, the suspend state notification from the suspend control circuit 202, and the sleep state notification from the sleep control circuit 203.

The logical product circuit 902 receives the offline state notification from the offline control circuit 201 for managing the thread 0 and the offline release indication using the JTAG circuit provided for the arithmetic device 100 but not illustrated in the attached drawings.

The logical product circuit 903 receives the suspend state notification from the suspend control circuit 202 for managing the thread 0 and the interrupt notification using the interrupt circuit provided for the arithmetic device 100 but not illustrated in the attached drawings.

The logical product circuit 904 receives the sleep state notification from the sleep control circuit 203 for managing the thread 0 and the output of the logical sum circuit 906 for receiving the interrupt notification and the timer interrupt notification from the timer circuit provided for the arithmetic device 100 but not illustrated in the attached drawings.

The logical sum circuit 905 receives the output of the logical product circuits 902 through 904.

The register 907 receives the output of the logical sum circuit 901 at the resetting terminal and the output of the logical sum circuit 905 at the setting terminal.

When the offline state notification, the suspend state notification, or the sleep state notification is input to the logical sum circuit 901, the logical sum circuit 901 outputs "1". Then, the register 907 is reset to "0". That is, the active flag indicates "0".

When the offline state notification is "1" and the offline release indication is "1", the logical product circuit 902 outputs "1". When the suspend state notification is "1" and the interrupt notification is "1", the logical product circuit 903 outputs "1". When the sleep state notification is "1" and the interrupt notification or the timer interrupt notification is "1", the logical product circuit 904 outputs "1". In these cases, the logical sum circuit 905 outputs "1". Then, the register 917 is set to "1".

Therefore, upon receipt of the offline state notification from the offline control circuit 201, the suspend state notification from the suspend control circuit 202, or the sleep state notification from the sleep control circuit 203, the thread mode control circuit 204 sets the active flag 0 to "1".

If the offline release indication is received in the offline state, the interrupt notification is received in the suspend state, or the interrupt notification or the timer interrupt notification is received in the sleep state, then the thread mode control circuit 204 sets the active flag 0 to "0".

Similarly, the logical sum circuit 911 receives the offline state notification from the offline control circuit 201 for managing the thread 1, the suspend state notification from the suspend control circuit 202, and the sleep state notification from the sleep control circuit 203.

The logical product circuit 912 receives the offline state notification from the offline control circuit 201 for managing the thread 1 and the offline release indication, and the logical product circuit 913 receives the suspend state notification from the suspend control circuit 202 for managing the thread 1 and the interrupt notification. The logical product circuit 914 receives the sleep state notification from the sleep control circuit 203 for managing the thread 1 and the output of the logical sum circuit 916 for receiving the interrupt notification and the timer interrupt notification.

The logical sum circuit 915 receives the output of the logical product circuits 912 through 914. The register 917 receives the output of the logical sum circuit 911 at the resetting terminal and the output of the logical sum circuit 915 at the setting terminal.

Since the operations of the logical circuits 911 through 917 are similar to those of the logical circuits 901 through 907, the detailed explanation is omitted here.

The logical product circuit 908 outputs "1" to the instruction execution circuit 101 when the register 907 indicates "1" and the register 917 indicates "1". Simultaneously, the negation circuit 909 outputs "0" to the instruction execution circuit 101. The output is the switch indication to the multi-thread mode.

The logical product circuit 908 outputs "0" to the instruction execution circuit 101 when the register 907 indicates "1" and the register 917 indicates a value other than "1". Simultaneously, the negation circuit 909 outputs "1" to the instruction execution circuit 101. The output is the switch indication to the single thread mode.

Figure 10:
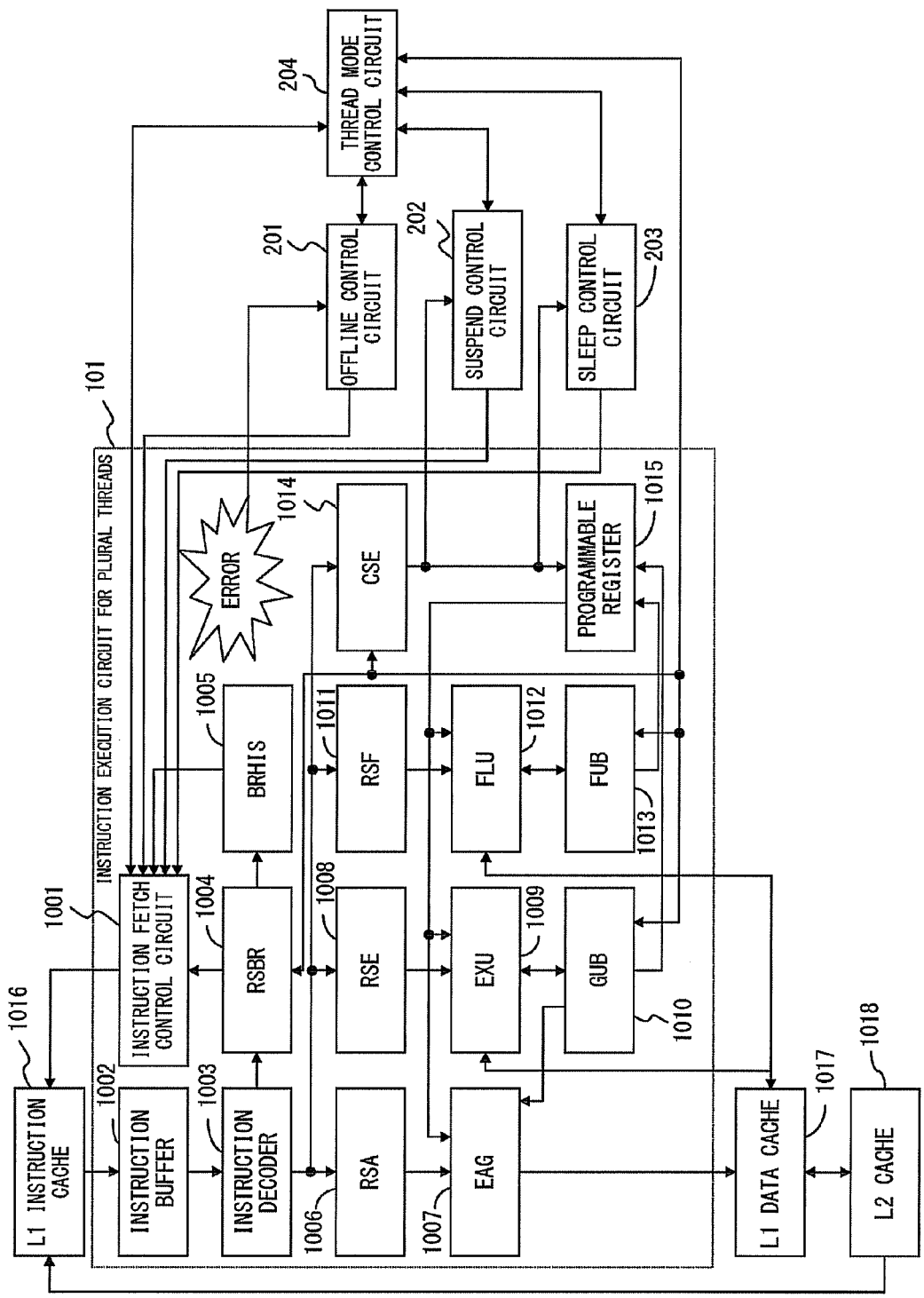
FIG. 10 is an example of a configuration of the instruction execution circuit according to an embodiment of the present invention.

FIG. 10 is an example of a configuration of the instruction execution circuit 101 according to an embodiment of the present invention.

the instruction execution circuit 101 illustrated in FIG. 10 includes, an instruction fetch control circuit 1001, an instruction buffer 1002, an instruction decoder 1003, an RSBR 1004, a BRHIS 1005, an RSA 1006, an EAG 1007, an 1008, an EXU 1009, a GUB 1010, an RSF 1011, an FLU 1012, an FUB 1013, a CSE 1014, and a programmable register 1015.

The instruction fetch control circuit 1001 instructs an L1 instruction cache 1016 to fetch an instruction sequence for each thread. The fetched instruction sequence is stored in the instruction buffer 1002.

Upon receipt of the switch instruction to the single thread mode from the thread mode control circuit 204, the instruction fetch control circuit 1001 instructs the L1 instruction cache 1016 to fetch the instruction sequence of a single thread. Upon receipt of the switch instruction to the multi-thread mode, the instruction fetch control circuit 1001 instructs the L1 instruction cache 1016 to fetch the instruction sequences of a plurality of threads.

The instruction fetch control circuit 1001 places the corresponding thread in the offline state at the offline indication from the offline control circuit 201, places the corresponding thread in the suspend state at the suspend indication from the suspend control circuit 202, and places the corresponding thread in the sleep state at the sleep indication from the sleep control circuit 203.

The instruction decoder 1003 decodes the instruction sequence for each thread fetched from the instruction buffer 1002, and issues an instruction to the RSBR 1004, the RSA 1006, the RSE 1008, the RSF 1011, the CSE 1014, etc. depending on the decoding result.

The RSBR 1004 awaits the completion of a branch address calculation, the determination of a branch direction, etc. on the branch instruction for a plurality of threads, instructs the BRHIS 1005 to perform update, and notifies the CSE 1014 of the completion of the branch instruction processing.

The BRHIS 1005 registers the branch direction, the branch target address, etc. of a previously executed instruction, and retrieves it when an instruction is fetched. The BRHIS 1005 predicts the instruction address of an instruction sequence to be executed, and notifies the instruction fetch control circuit of the address.

The RSA 1006 first awaits all necessary instructions and data for the address calculation, and then inputs the instructions and the data to the EAG 1007.

The EAG 1007 performs a necessary address calculation for the instruction processing, fetches the data from an L1 data cache 1017 on the basis of the calculated address, or stores the data.

The L1 instruction cache 1016 and the L1 data cache 1017 request an L2 cache 1018 to transmit an instruction and data when there are no instructions and data.

The RSE 1008 first awaits all necessary data for the operations of instruction requiring integral arithmetic, and then inputs the instructions and the data to the EXU 1009.

The EXU 1009 performs the integral arithmetic process, and stores the arithmetic result in the GUB 1010.

The RSF 1011 awaits all necessary data for the arithmetic operation requiring floating-point arithmetic, and then inputs the instructions and data to the FLU 1012.

The FLU 1012 performs a floating-point arithmetic, and stores an arithmetic result in the FUB 1013.

The CSE 1014 monitors the completion of all necessary processes for the instruction processing, completes the instruction in the order of the instruction sequence, and specifies the update of the programmable register 1015. When the suspend instruction is executed, the suspend notification is transmitted to the suspend control circuit 202. When the sleep instruction is executed, the sleep notification is transmitted to the sleep control circuit 203.

Each circuit in the above-mentioned instruction execution circuit 101 is provided with an error detection circuit for detecting a hardware error not illustrated in the attached drawings. Upon detection of a hardware error during the execution of an instruction, the error detection circuit transmits the error notification to the offline control circuit 201.

The resources divided among threads such as the instruction buffer 1002, the RSBR 1004, the GUB 1010, the FUB 1013, the CSE 1014, etc. optimize the resources at the thread mode switch indication from the thread mode control circuit 204.

For example, the resources divided among threads such as the instruction fetch control circuit 1001, the RSBR 1004, the GUB 1010, the FUB 1013, the CSE 1014, etc. are divided and assigned to each thread in the multi-thread mode. However, upon receipt of a switch indication to switch the mode to the single thread mode, the resources are assigned to a single thread so that the thread may occupy all resources.

To be more concrete, for example, when the CSE 1014 is configured by the maximum of 64 CSEs, 32 CSEs are assigned to each thread in the multi-thread mode (for example, when the number of threads is 2), and all of 64 CSEs are assigned to the single thread in the single thread mode.

As described above, the arithmetic device 100 according to the present embodiment performs the optimization by reassigning the hardware resources (resources divided among threads) depending on the thread mode. Therefore, an arithmetic process may be performed by effectively using the hardware resources.

As a result, although the multi-thread mode is switched to the single thread mode due to a hardware error, the process may be continued with degradation of the entire performance minimized.

Figure 11:
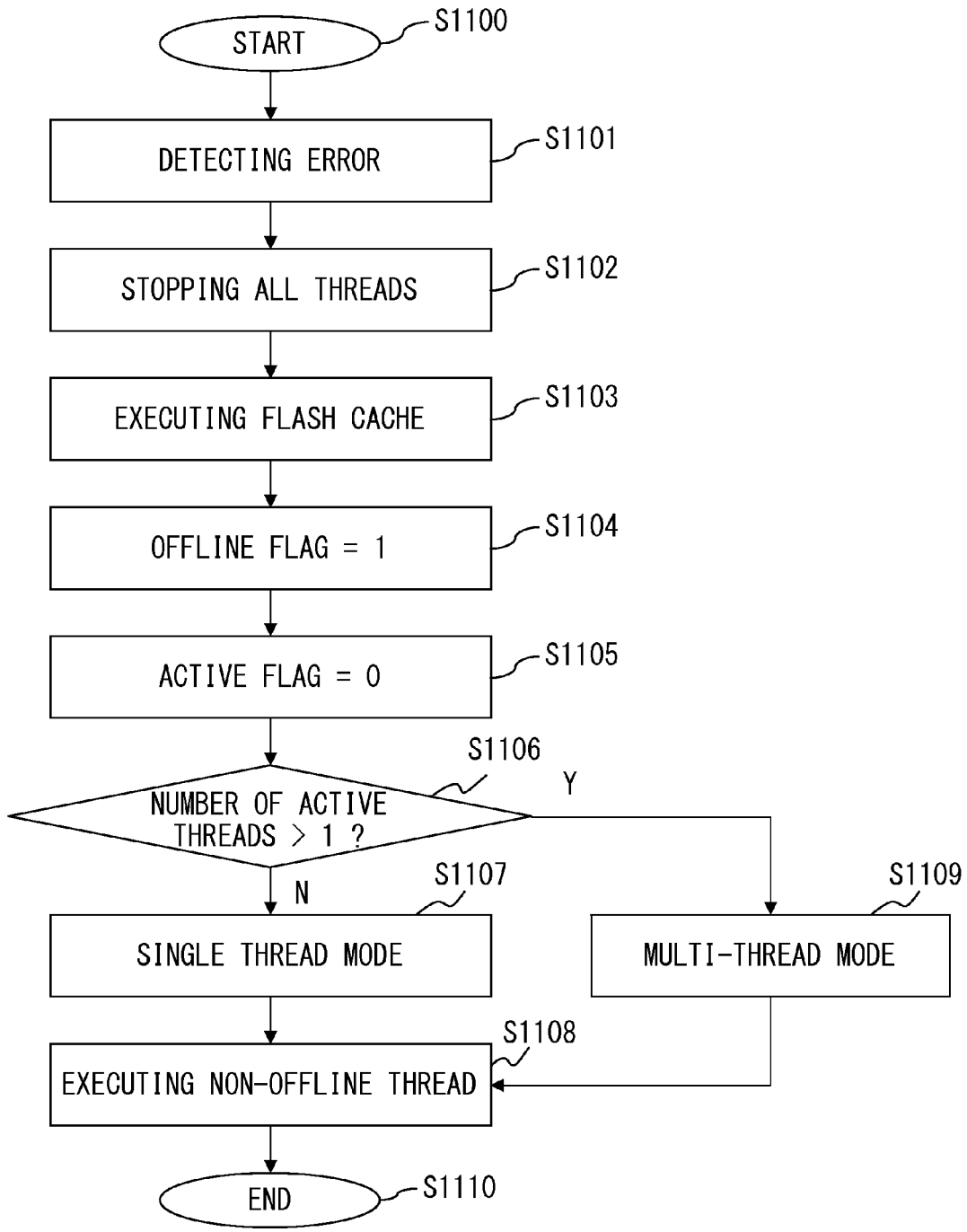
FIG. 11 is a flowchart of the thread mode switching process when a hardware error is detected according to an embodiment of the present invention.

FIG. 11 is a flowchart of the thread mode switching process when a hardware error is detected according to the present embodiment.

In step S1101, when the instruction execution circuit 101 detects a hardware error during the execution of an instruction, it issues an error notification to the offline control circuit 201. Then, the instruction execution circuit 101 passes control to step S1102.

In step S1102, the instruction execution circuit 101 places all threads in the stop state. The stop state refers to a hardware state different from the offline state, the suspend state, or the sleep state. That is, the execution of an instruction sequence of a thread is stopped in the stop state.

In step S1103, the instruction execution circuit 101 performs a cache flash process. In this process, the resources divided among threads and the resources shared among threads are all cleared.

In step S1104, upon receipt of the error notification in step S1101, the offline control circuit 201 sets the offline flag of the corresponding thread to "1". Then, the offline control circuit 201 issues the offline indication to the instruction execution circuit 101, and the offline state notification to the thread mode control circuit 204.

In step S1105, upon receipt of the offline state notification from the offline control circuit 201, the thread mode control circuit 204 sets the active flag of the corresponding thread to "0".

In step S1106, the thread mode control circuit 204 determines whether or not the number of threads having the active flag set to "1" (hereinafter referred to as a "active thread") exceeds 1. If the number of active threads is 1 or less, the thread mode control circuit 204 passes control to step S1107.

In step S1107, the thread mode control circuit 204 sets the single thread mode flag to "1" (sets the multi-thread mode flag to "0") and instructs the instruction execution circuit 101 to switch to the single thread mode.

In this case, the instruction execution circuit 101 optimizes the resources. That is, the circuit reassigns the resources so that the thread not in the offline state (hereinafter referred to as a "non-offline thread") may occupy the resources divided among threads and the resources shared among threads.

In step S1106, when the number of active threads is 2 or more, the thread mode control circuit 204 passes control to step S1109.

In step S1109, the thread mode control circuit 204 sets the multi-thread mode flag to "1" (sets the single thread mode flag to "0"), and instructs the instruction execution circuit 101 to switch to the multi-thread mode.

Also in this case, the instruction execution circuit 101 optimizes the resources. That is, it reassigns the resources divided among threads and the resources shared among threads for each non-offline thread.

In step S1108, the instruction execution circuit 101 starts the execution of the non-offline thread, and terminates the thread mode switching process.

FIG. 12 is a flowchart of the thread mode switching process during the execution of the suspend instruction or the sleep instruction according to the present embodiment. Since the processes at the suspend instruction execution time and the sleep instruction execution time are similar to each other, the thread mode switching process at the suspend instruction execution time is mainly described below, and the specific process of the sleep instruction is described in the parentheses.

In step S1201, when the instruction execution circuit 101 executes the suspend instruction (sleep instruction), it issues the suspend notification (sleep notification) to the suspend control circuit 202 (sleep control circuit 203).

In step S1202, upon receipt of the suspend notification (sleep notification) from the instruction execution circuit 101, the suspend control circuit 202 (sleep control circuit 203) sets the suspend flag (sleep flag) of the corresponding thread to "1". Then, the suspend control circuit 202 (sleep control circuit 203) issues the suspend indication (sleep indication) on the instruction execution circuit 101, and issues the suspend state notification (sleep state notification) to the thread mode control circuit 204.

In step S1203, upon receipt of the suspend indication (sleep indication), the instruction execution circuit 101 places the execution of all threads in the cancellation state, and clears the contents of the resources divided among threads and the resources shared among threads.

In step S1204, the thread mode control circuit 204 determines whether or not it is currently placed in the single thread mode. That is, the thread mode control circuit 204 refers to the single thread mode flag and determines whether or not the single thread mode flag indicates "1".

In the single thread mode, the thread mode control circuit 204 passes control to step S1208 without setting the active flag of the corresponding thread to "0". When the thread mode control circuit 204 is not in the single thread mode, it passes control to step S1205.

Although not illustrated in FIG. 9, for example, if the value of the logical product of the output of the logical sum circuit 905 and the output of the negation circuit 909 is input to the setting terminal of the register 907, and the value of the logical product of the output of the logical sum circuit 915 and the output of the negation circuit 909 is input to the setting terminal of the register 917, then the process in the current step may be realized.

In step S1205, the thread mode control circuit 204 sets the active flag of the corresponding thread to "0" according to the suspend state notification (sleep state notification) in step S1202.

In step S1206, the thread mode control circuit 204 determines whether or not the number of active threads exceeds 1. If the number of the active threads is 1 or less, the thread mode control circuit 204 passes control protocol S1207.

In step S1207, the thread mode control circuit 204 sets the single thread mode flag to "1" (sets the multi-thread mode flag to "0"), and instructs the instruction execution circuit 101 to switch to the single thread mode.

In this case, as in step S1107 in FIG. 11, the instruction execution circuit 101 optimizes the resources.

In step S1206, when the number of active threads is two or more, the thread mode control circuit 204 passes control to step S1209.

In step S1208, the thread mode control circuit 204 sets the multi-thread mode flag to "1", (sets the single thread mode flag to "0"), and instructs the instruction execution circuit 101 to switch to the multi-thread mode.

In this case, as in step S1109 in FIG. 11, the instruction execution circuit 101 optimizes the resources.

In step S1209, the instruction execution circuit 101 releases the cancellation of the execution of all threads, and resumes the process of a thread in the active state, thereby terminating the thread mode switching process.

FIG. 13 is a flowchart of the thread mode switching process when the suspend state or the sleep state is released according to the present embodiment. As in FIG. 12, since the processes at the suspend instruction execution time and the sleep instruction execution time are similar to each other, the thread mode switching process at the suspend instruction execution time is mainly described below, and the specific process of the sleep instruction is described in the parentheses.

In step S1301, upon receipt of the interrupt notification (interrupt notification or timer interrupt notification), the suspend control circuit 202 (sleep control circuit 203) passes control to step S1302.

In step S1302, the thread mode control circuit 204 determines whether or not the corresponding thread is in the active state. That is, the thread mode control circuit 204 determines whether or not the active flag of the corresponding thread indicates "1".

When the active flag indicates "0", the thread mode control circuit 204 passes control to step S1303.

In step S1303, the instruction execution circuit 101 changes the execution of all threads into the cancellation state, and clears the contents of the resources divided among threads and the resources shared among threads.

In step S1304, the thread mode control circuit 204 sets the active flag of the corresponding thread to "1".

In step S1305, the thread mode control circuit 204 determines whether or not the number of active threads exceeds 1. If the number of active threads is 1 or less, the thread mode control circuit 204 passes control to step S1306.

In step S1306, the thread mode control circuit 204 sets the single thread mode flag to "1" (sets the multi-thread mode flag to "0"), and instructs the instruction execution circuit 101 to switch to the single thread mode.

In this case, as in step S1107 in FIG. 11, the instruction execution circuit 101 optimizes the resources.

In step S1305, when the number of active threads is 2 or more, the thread mode control circuit 204 passes control to step S1307.

In step S1307, the thread mode control circuit 204 sets the multi-thread mode flag to "1" (sets the single thread mode flag to "0"), and instructs the instruction execution circuit 101 to switch to the multi-thread mode.

In this case, as in step S1109 in FIG. 11, the instruction execution circuit 101 optimizes the resources.

In step S1308, the suspend control circuit 202 (sleep control circuit 203) sets the suspend flag (sleep flag) of the corresponding thread to "0".

In step S1309, the instruction execution circuit 101 releases the cancellation of the execution of all threads, and resumes the process of a thread in the active state, thereby terminating the thread mode switching process.

In step S1302, when the active flag indicates "1", the thread mode control circuit 204 passes control to step S1310.

In step S1310, the suspend control circuit 202 (sleep control circuit 203) sets the suspend flag (sleep flag) of the corresponding thread to "0".

That is, when the active flag indicates "1", the thread mode is not switched only by setting "0" in the suspend flag (sleep flag) because, as in steps S1204 and S1210 illustrated in FIG. 5, the thread that enters the suspend state (sleep state) in the single thread mode holds the active state.

Therefore, when the suspend control circuit 202 (sleep control circuit 203) sets the suspend flag (sleep flag) to "0", the normal instruction process is resumed on the corresponding thread. That is, when the suspend state (sleep state) is released by the interrupt notification, the interrupt trap generating process is performed, and when the sleep state is released by the timer interrupt notification, the process is started from the instruction subsequent to the sleep instruction.

As described above, when the suspend state (sleep state) is entered in the single thread mode, the thread continues the active state. Therefore, when the suspend state (sleep state) is released by the interrupt notification etc., the normal process may be immediately resumed without placing the corresponding thread in the active state (steps S1303 and S1304) and changing the thread mode (steps S1305 through S1307) etc.

As described above, in the arithmetic device 100 according to the present embodiment, when the instruction execution circuit 101 detects a hardware error, the offline control circuit 201 issues an offline indication on the erroneous thread and places the erroneous thread in the offline state.

On the other hand, the thread mode control circuit 204 monitors the active state of each thread, and upon receipt of the offline state notification from the offline control circuit 201, it determines that the corresponding threshold is changed to the inactive state. When the number of active threads changes from 2 or more to 1 or less (and 0 or more), the thread mode control circuit 204 instructs the instruction execution circuit 101 to switch to the single thread mode.

The instruction execution circuit 101 switches from the multi-thread mode to the single thread mode at the indication from the thread mode control circuit 204, and perform the optimization to the single thread mode.

That is, when the arithmetic device 100 according to the present embodiment detects a hardware error, the device places the erroneous thread in the offline state, and continues the arithmetic process of a non-offline thread. Furthermore, when the thread in the active state indicates 1 or less, it automatically changes into the single thread mode, and performs the optimization into the single thread mode, makes the most of the hardware resources, and continues the arithmetic process.

As a result, although a hardware error occurs, the degradation of the entire performance maybe minimized, and the process may be continued.

In addition, if the suspend instruction is executed in the single thread mode, the corresponding thread is placed in the suspend state as the active state (the process of YES in step S1204). Therefore, if the suspend state is released according to the specific interrupt notification, the execution may be immediately resumed (the process of YES in step S1302 illustrated in FIG. 13).

Similarly, when the sleep instruction is executed in the single thread mode, the corresponding thread is placed in the sleep state as the active state (the process of YES in step S1204 illustrated in FIG. 12). Therefore, if the sleep state is released by a specific interrupt notification or timer interrupt notification, the execution may be immediately resumed (the process of YES in step S1302 illustrated in FIG. 13).

As a result, the overhead for resuming a process performed to suspend the thread processing such as awaiting a lock release, synchronization between threads, etc. temporarily or for a short time after applying the suspend instruction and the sleep instruction may be reduced.

In addition, when the suspend state or the sleep state is released, the process of the thread in the active state is resumed on a priority basis. Therefore, it may not be necessary to be aware of other threads when the suspend state or the sleep state are released. Accordingly, all threads may be easily placed in the suspend state and the sleep state by software (using the suspend instruction and the sleep instruction).

What is claimed is:

1. An arithmetic device, comprising:
an instruction execution circuit configured to execute a multi-thread mode in which the instruction sequences of a plurality of threads are concurrently executed and a single thread mode in which the instruction sequence of a single thread is executed, configured to reassign hardware resources to a single thread when executing in the single thread mode and divide the hardware resources between the threads active when executing in the multi-thread mode, and configured to place in an offline state an erroneous thread in which a hardware error has occurred during the execution of instruction sequence of the thread when the error is detected; and
a switch indication circuit having a thread mode control circuit configured to store a state of a thread in the offline state as an inactive state in a state storage device for storing a state of a thread, and further configured to issue an indication to the instruction execution circuit to switch between the multi-thread mode and the single thread mode depending on the change of the number of threads in the active state, the switch indication circuit including,
for each thread an offline control circuit configured to instruct the instruction execution circuit to place the erroneous thread in the offline state upon receipt of an error notification from the instruction execution circuit that a hardware error has been detected,
for each thread a suspend control circuit configured to instruct the instruction execution circuit to place a thread that has executed a suspend instruction in a suspend state upon receipt of a suspend notification from the instruction execution circuit that the suspend instruction has been executed,
the thread mode control circuit configured to receive an offline notification from the offline control circuit that the erroneous thread has been placed in the offline state and stores a state of the thread that has entered the offline state as an inactive state in the state storage device, and configured to instruct the instruction execution circuit to switch from the multi-thread mode to the single thread mode when the number of threads in the active state changes from 2 or more to 1 or less,
the thread mode control circuit further configured to store a state of the thread in the suspend state as an inactive state in the state storage device upon receipt of a suspend notification from the suspend control circuit that the thread has been placed in the suspend state when executing in the multi-thread mode, and
the thread mode control circuit further configured to store a state of the thread in the suspend state as an active state in the state storage device upon receipt of a suspend notification from the suspend control circuit that the thread has been placed in the suspend state when executing in the single thread mode to keep in an active state a thread which has executed a suspend instruction in the single thread mode and has been placed in the suspend state.

2. The device according to claim 1,
further comprising for each thread a suspend control circuit configured to control a suspend state of the thread, and configured to instruct the instruction execution circuit to release the suspend state of the thread according to a specific interrupt notification upon receipt of the notification,
wherein the thread mode control circuit stores in the state storage device a notification that the suspend state of the thread has been released upon receipt of the notification, and instructs the instruction execution circuit to switch from the single thread mode to the multi-thread mode when the number of threads in the active state changes from 1 or less to 2 or more.

3. The device according to claim 2, wherein the thread mode control circuit does not instruct the instruction execution circuit to switch the thread mode when a thread is in the active state upon receipt of a notification from the suspend control circuit that the suspend state of the thread has been released in the single thread mode.

4. The device according to claim 2, wherein the thread mode control circuit places a thread in the active state when the thread is not in the active state upon receipt of a notification from the suspend control circuit that the suspend state of the thread has been released in the single thread mode, places other threads in the active state into the inactive state, and does not instruct the instruction execution circuit to switch the thread mode.

5. The device according to claim 1,
further comprising for each thread a sleep control circuit configured to control a sleep state of the thread and configured to instruct the instruction execution circuit to place the thread in the sleep state upon receipt of a sleep notification from the instruction execution circuit that a sleep instruction has been executed,
wherein the thread mode control circuit receives the sleep notification from the sleep control circuit that the thread has been placed in the sleep state and stores in the state storage device the notification that the thread in the sleep state as inactive state.

6. The device according to claim 1,
further comprising for each thread a sleep control circuit configured to control a sleep state of the thread and configured to instruct the instruction execution circuit to release the sleep state of the thread according to a specific interrupt notification or a timer interrupt notification,
wherein the thread mode control circuit receives a notification from the sleep control circuit that the sleep state of the thread has been released, stores the notification of the thread as in the active state, and instructs the instruction execution circuit to switch from the single thread mode to the multi-thread mode when the number of threads in the active state is changed from one or less to two or less.

7. The device according to claim 5, wherein the thread mode control circuit receives the sleep notification from the sleep control circuit that the thread has been placed in the sleep state in the single thread mode, but stores the notification of the thread in the sleep state as in the active state.

8. The device according to claim 6, wherein the thread mode control circuit receives a notification from the sleep control circuit that the sleep state of the thread has been released in the single thread mode, and does not instruct the instruction execution circuit to switch the thread mode when the thread is in the active state.

9. The device according to claim 6, wherein the thread mode control circuit receives a notification from the sleep control circuit that the sleep state of the thread has been released in the single thread mode, and places the thread in the active state when the thread is not in the active state, places a thread in any other active state into an inactive state, and does not instruct the instruction execution circuit to switch the thread mode.

* * * * *